United States Patent Office 3,517,097
Patented June 23, 1970

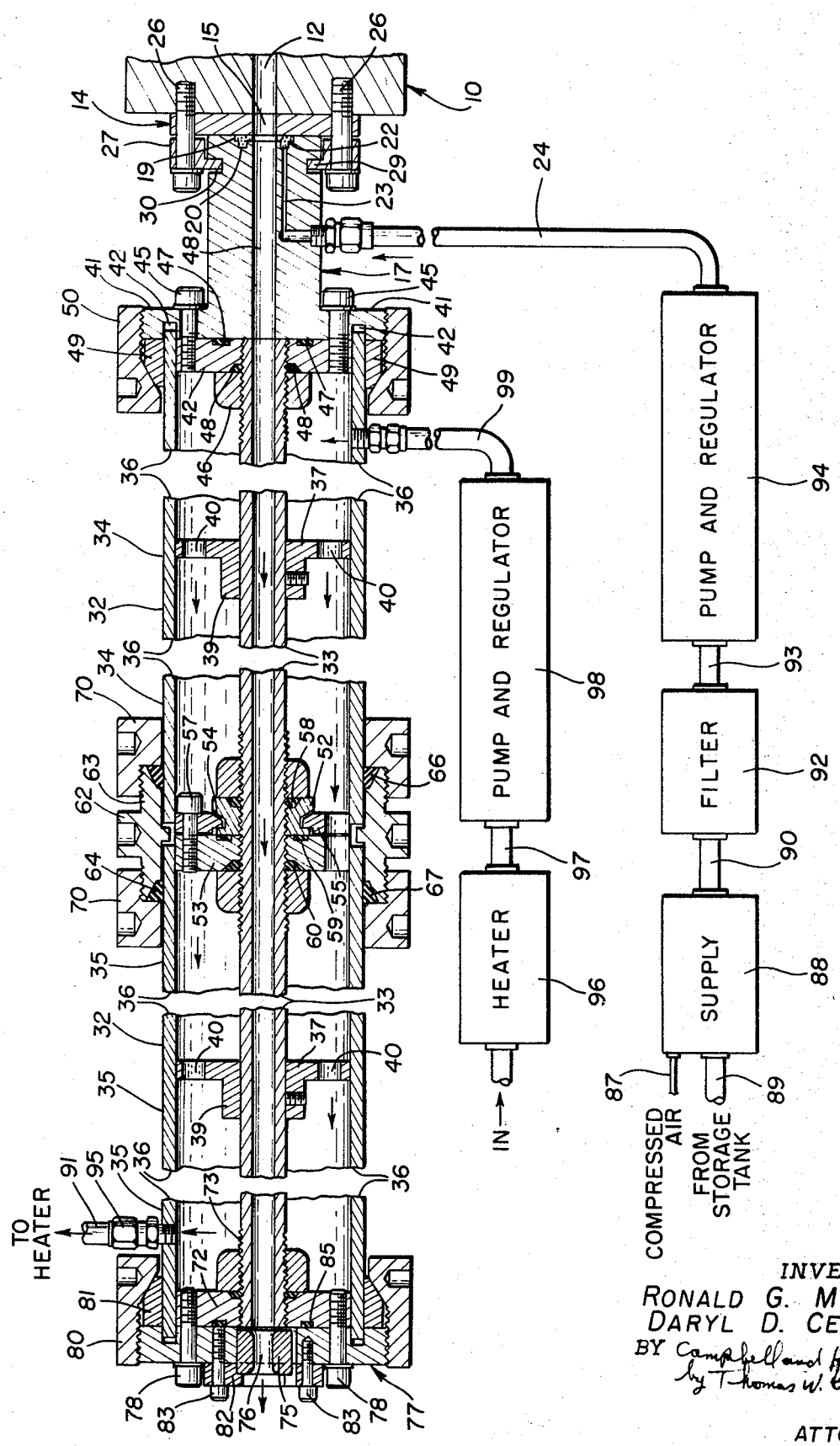

3,517,097
METHOD FOR FORMING AND CURING CONTINUOUS ELASTOMERIC STRIP
Ronald G. Mixell, Muncie, Ind., and Daryl D. Cerny, Greenville, Ohio, assignors to Ball Corporation, a corporation of Indiana
Filed Nov. 23, 1966, Ser. No. 596,582
Int. Cl. B29c 1/04, 25/00; B29g 2/00
U.S. Cl. 264—177
7 Claims

ABSTRACT OF THE DISCLOSURE

A continuous method of forming uncured elastomers and accurately maintaining the desired shape while curing wherein the elastomer is externally lubricated and confined under pressure while being heated to cure the elastomer, and preferred apparatus for carrying out the method.

---

This invention relates to an extrusion method for forming continuous elastomeric strip. More particularly, this invention relates to a new and improved method for producing continuous cured strip from moldable rubber materials.

Uncured natural or synthetic rubber may be readily formed into many shapes and configurations. In the uncured state, it is much like thermoplastic polymers. Thus, uncured rubber can be extruded in many useful and often complex cross sections. However, it is necessary to cure the extruded rubber to produce the properties commonly attributed to elastomers.

Curing is accomplished by subjecting the uncured rubber to elevated temperatures for a substantial length of time. Though curing is a time-temperature function, there are, of course, optimum temperatures and corresponding optimum periods of cure.

In the production of solid strip articles, such as that employed for sealing gaskets in large water or sewer pipes, or strips such as moldings and mountings for window glass, from moldable elastomeric materials, it has been customary in the art to uniformly form a plurality of strips of a fixed length, often up to fifty feet, and to individually cure each length of strip in a heating chamber on a batch process principle so as to produce a final length of strip material. This approach to the extrusion and curing of elastomeric materials has several drawbacks. For instance, the uncured material does not have great strength. Further, while in the uncured state, the material is initially subject to further loss of strength at cure temperatures. Thus, the mere weight at curing temperatures of many extruded cross sections is enough to cause deformation before sufficient curing is accomplished to provide strength. Also, minor gaseous inclusions which expand when released from the confines of the extrusion die can cause extensive porosity in the low strength uncured extruded material. Extrusion, of course, is accomplished at relatively high pressures and, as the material vents from the extruder to atmospheric pressure, these gaseous inclusions expand greatly, thereby causing a substantial void in the material. Though many steps, including vacuum treatment of the material before extruding, have been taken to avoid gaseous inclusions in the extrudate, the problem of porosity continues to exist though perhaps to a diminished extent.

The above-mentioned batch process presents yet other disadvantages. For example, it is advantageous in both the storing and use of strip material to be able to mount continuous finished strip on rolls and to withdraw only the specific amount which is needed for a particular job. This not only reduces the waste resulting from unusable short end lengths of strip, but also eliminates the problem of splicing or connecting lengths of material in order to form a required long length of material. Such a connection is normally difficult to achieve and presents an unsightly appearance and inherent weakness at the joint.

Thus, it is an object of the instant invention to provide a new and improved method for forming cured continuous strip from moldable elastomeric material.

It is an additional object of the instant invention to provide a method for forming continuous cured strips in a variety of shapes and sizes at high speed.

Another object of the instant invention is to provide a new and improved method for continuously curing rubber strip to produce a product with a cross-sectional area within very close tolerances.

Yet another object of the instant invention is to provide a method wherein the rubber strip is cured under substantial positive pressure in order to minimize porosity of the cured material.

Yet another object of the instant invention is to provide a method for curing strip material while supporting such strip material in a desired cross section to avoid deformation before the cure strength is sufficient to maintain the desired cross section.

Other objects and advantages of the instant invention will be apparent from the following detailed description and drawing.

According to the instant invention, cured continuous elastomeric strip material is produced by first extruding the uncured material through an extrusion die and thereafter confining the thus extruded material within a cure die. The cure die is maintained at or somewhat above the cure temperature of the particular elastomer stock used, and is of such length as to retain the strip for an appropriate cure period.

Since the strip is under substantial pressure in the cure die, and since the cure die may be 30 or more feet in length, it would normally be impossible to force the strip through the cure die because of frictional forces. To overcome this obstacle, a lubricating die is positioned upstream of the cure die, preferably between the extrusion die and the cure die. A thin film of lubricant is dispersed onto the extruded strip to permit it to pass smoothly through the elongated cure die.

The lubracating die may be merely an appropriately cross sectioned orifice having numerous ports for ejection of the lubricant. However, this die is preferably of a porous material, such as sintered metal, in order that the lubricant may be forced through the die and on to the strip material at substantially all points. Though the lubricant is forced through the lubricant containing die under rather substantial pressure, the requirements and tolerances are such that only a small amount is actually deposited on a unit length of strip. Thus the actual consumption of lubricant is not of a substantial magnitude.

Only general criteria need be determined to select a satisfactory lubricant. Most water-soluble lubricants are inert to rubber. Of course, the lubricant must be stable at curing temperature, but this is not a difficult requirement. Suitable lubricants include polyalkylene glycols such as polypropylene glycol, polyethylene glycol, etc., which are liquid in the desired temperature range. Those skilled in the art will readily recognize numerous other suitable lubricants equally useful in the instant invention.

When cured, elastomeric material is reduced in size from the unstressed, uncured size. Thus, in the instant invention, the extrusion die is oversize by a small extent relative to the desired final cross section. However, the extrusion die is slightly smaller in cross section than either the lubricating die or the cure die. Though the lubricating and cure die may be of the same size, it is preferable that the lubricating die be somewhat larger in cross-section than the cure die and also larger in cross-section than the extrusion die. Though differences in cross-sectional diameter are desirable, the actual increments are relatively small and the cure die is seldom larger than 10% greater in area than the extrusion die.

A desirable though not mandatory feature of the instant invention is the provision of a final constriction, or snubber, to restrict the extrudate as it leaves the end of a cure die. The purpose of this feature is primarily to strip most of the lubricant from the material.

It will be recognized that the strip material is usually oversize as it leaves the end of the cure die because of the elevated temperature and, perhaps, incomplete cure. Though the cure may be incomplete, it is adequate to maintain the strip in the desired shape. Of course the strip remains at an elevated temperature for a period after leaving the cure die and thus curing continues to completion. After curing is complete and the strip cools to room temperature, the strip contracts to the desired dimension despite having passed only through dies larger than that size. Of course the dies are only slightly oversize. For instance relative to the final size of the strip, the extrusion die is less than or equal to about 5% oversized, and preferably 1% to 2%. On the same basis, the lubricating die is 1% to 25% oversize and preferably 15% to 20%, while the cure die is less than or equal to about 5% oversize, and preferably 3% to 6%. Through an optional feature, the final constriction may be greater than or equal to about 25% undersize relative to the cure die, and preferably 15% to 20%.

Referring now to the drawing, there is shown a portion of an extruder head 10 having an exit passageway 12 therethrough. A forming die 14 having a forming passageway 15 therethrough is pressed against head 10 and forming passageway 15 is axially aligned with the exit passageway 12 in extruder head 10. A lubricating die 17 having a lubricating passageway 18 therethrough, axially aligned with forming passageway 15 from forming die 14 and exit passageway 12 through extruder head 10, is held against the opposite side of forming die 14. Lubricating die 17 has an annular recess 19 around the periphery of its outside surface adjacent to forming die 14.

An annular recess 19 is provided in lubricating die 17 at the end surface adjacent to forming die 14 and extending from the inside surface of lubricating passageway 18 to a point approximately midway through the wall of lubricating die 17. Lubricating die 17 has a second annular recess 20 adjacent annular recess 19, spaced from the inside surface of passageway 18, and connecting with annular recess 19. An annular lubricating ring 22 is inserted into annular recess 19 of lubricating die 17. Ring 22 may be made of any porous material such as sintered iron. An inlet passageway 23 through lubricating die 17 connects second annular recess 20 with oil line 24 through connection 25.

The above assembly of extruder head 10, forming die 14, ring 22 and lubricating die 17 is held together by bolts 26 passing through holes in a retaining ring 27, passing through forming die 14, and threadedly mounted in extruder head 10. Retaining ring 27 is a split ring and has a radially inwardly depending lip 29 which is inserted into annular groove 30 around the periphery of lubricating die 17. Thus, force from bolts 26 presses lubricating ring 22 against lubricating die 17, holding it in place, and forces lubricating die 17, forming die 14, and extruder head 10 together in a sealing connection.

A curing die 32, having a curing passageway 33 therethrough and comprising two portions 34 and 35, each portion having threads around the outside periphery thereof adjacent each end, abuts the exit end of lubricating die 17 so that curing passageway 33 is axially aligned with lubricating passageway 18. Each portion 34 and 35 of curing die 32 is intermediately supported concentrically within a hollow heat transfer housing 36 by means of a supporting ring 37 extending from the outside surface of curing passageway 33 to the inside surface of heat transfer housing 36. Supporting ring 37 has a flange portion 39 which is fastened to the outside surface of curing die 32 by means of a set screw passing through flange portion 39 and bearing against outside surface of curing die 32. Holes 40 are provided in supporting ring 37 to allow the passage of fluid therethrough.

The end of curing die 32 adjacent to lubricating die 17 is attached thereto and axially aligned therewith by a sealing connection. Accordingly, lubricating die 17 has an annular, radially outwardly depending flange 41, the outside peripheral surface of which is threaded. Flange 41 has an annular groove 42 in its endmost surface into which is slidably inserted the end of housing 36. The cavity defined by the inside surface of housing 36 and the outside surface of curing die 32 is sealed at the end adjacent to lubricating die 17 by means of a sealing ring 44 threadedly mounted on the entrance end of curing die 32. Sealing ring 44 is fastened to the end of lubricating die 17 by means of bolts 45 passing through flange 41 and threadedly connecting into holes in sealing ring 44. A lock nut 46 is secured adjacent and engaged against the side of sealing ring 44 opposite lubricating die 17. Annular seals 47 and 48 of a compressive material serve to prevent fluid leakage through the respective connections. A larger annular seal 49 is mounted around the outside periphery of housing 36 adjacent to its entrance end. A seal retaining ring 50 is threadedly mounted on the outside periphery of flange 41 of lubricating die 17 and serve to press seal 49 against the connection of housing 36 and flange 41, thus preventing leakage of fluid through this connection.

The two portions 35 and 34 of curing die 32 are aligned and connected by a sealing connection. Thus, a sealing ring 52 is threadedly mounted on one end of curing die portion 34 and locked in place by a lock nut. A second sealing ring 53 is mounted on one end of curing die portion 35 and locked in place by a lock nut. Sealing ring 53 has portions extending radially outward into contact with the inside surface of housing 36. Sealing ring 52 has an annular groove 54 about its outside periphery. A split ring 55 abutting sealing ring 53 and encircling sealing ring 52 has a lip which extends into annular groove 54 when split ring 55 is peripherally tightened around sealing ring 52. Bolts 57 pass through split ring 52 and threadedly engage sealing ring 53, thus forcing sealing ring 53 into contact with sealing ring 52 and split ring 55, and the end of cure die portion 34 into contact with the end of cure die portion 35. Annular seals 58, 59 and 60 serve to prevent the passage of fluid through joints, respectively.

A connecting ring 62 having flanges 63 and 64 is mounted around the outside surface of housing 36 so that flanges 63 and 64 overlap end portions of housing portions 36, flanges 63 and 64 having threads about the outside peripheral surfaces thereof. Sealing gaskets 66 and 67 are inserted into recessed grooves in the end of flanges 63 and 64. Annular retaining rings are mounted around each flange 63 and 64, and are threadedly engaged thereon, serving to compress sealing gaskets 66 and 67 and provide a fluid-tight connection between housing portions 36.

The cavity defined by housing 36 and curing passageway 33 is blocked at the exit end remote from lubricating die 17 by a sealing ring 72 extending radially from the threaded portion 73 outwardly to contact the inside surface of housing portion 36. Sealing ring 72 is threadedly mounted on threaded portion 73 and held in place by a lock nut. A snubber die 75 having a passageway 76 therethrough with a cross-sectional area much less than the cross-sectional area of die passageway 33 abuts the end of cure die portion 35.

Snubber die 75 is mounted within a supporting ring 77 which is attached to the end surface of sealing ring 72 by means of bolts 78 passing through supporting ring 77 and threadedly engaging sealing ring 72. Supporting ring 77 has an annular recess in its side adjacent sealing ring 72 and into which the end of housing 36 is slidably inserted. The outside periphery of supporting ring 77 is threadedly engaged with the inside surface of a retaining ring 80 which presses a sealing gasket 81 into the connection between housing 36 and supporting ring 77.

Snubber die 75 is retained within supporting ring 77 and against the end of curing die portion 35 by means of a retaining ring 82 which is fastened to supporting ring 77 by means of bolts 83 passing through retaining ring 82 threadedly inserted into supporting ring 77. A lip on retaining ring 82 engages the endmost edge of snubber die 75 and holds it in position. A passageway 85 is provided at the base of snubber die 75 to allow lubricating oil wiped by snubber die 75 from the outside surface of a formed and cured strip to be removed.

To provide lubricating to a strip within curing die 32, compressed air is fed through tube 87 into a supply tank 88 into which oil passes through tube 89 from storage tank, not shown. Oil is forced from supply tank 88 through tube 90 into a filtering unit 92 and then passes through tube 93 into a pump 94. The oil is forced by pump 94 under pressure through tube 24 into connector 25 and to lubricating ring 22 through passageway 23.

Housing 36 has a connection 95 at the exit end thereof and a tube 91 through which heat-transfer fluid is returned to a storage tank, not shown. A heater 96 heats fluid from the storage tank which then passes through tube 97 into a pump 98, from where it passes through tube 99 under pressure through the cavity created between cure die 32 and housing 36. Thus, a fluid such as hot oil is circulated around passageway through the exit connector 95 and through tube 91 back to the storage tank.

From the drawing and above discussion it will be apparent that the instant invention permits forming and curing of elastomeric material under substantial pressure. Thus, the material is positively confined and supported in the desired shape until curing is essentially complete. Also, the instant invention permits production of cured strip materials in continuous lengths.

It will be apparent from the above description that various modifications in the method and apparatus described may be made without varying from the scope of the invention. Therefore, the invention is not intended to be limited to the specific details herein described except as may be required by the following claims.

What is claimed is:

1. A method for molding heat curable material in the form of a strip of definite desired cross-sectional shape and area, comprising the steps of initially forming a strip under pressure of a dimension less than or equal to about 5% oversized relative to the desired strip, advancing and laterally enlarging said strip to a cross-sectional area no larger than 25% greater than the cross-sectional area of the extrusion orifice, advancing and applying lubricant to the outside surface of said strip, advancing, confining and shaping said strip into a cross-section less than or equal to about 10% oversized relative the desired strip, further advancing and vulcanizing the material by applying heat while said lubricated strip is in a confined condition, said extrusion, enlargement, lubrication and vulcanization being accomplished in adjacent sections of a continuous channel, and releasing said vulcanized strip whereby it freely assumes substantially the definite cross-sectional shape and area of the desired strip upon cooling.

2. A method as set forth in claim 1 wherein said material is initially formed under pressure into a solid strip by extrusion through an extrusion die having the cross-sectional shape of the desired strip and a cross-sectional area greater than the desired cross-sectional area of the strip.

3. A method as set forth in claim 1 wherein the strip is advanced and sharply constricted after being relieved from said confined condition by passing it through a passage having a cross-sectiional area less than the desired cross-sectional area of said strip so as to substantially remove said thin film of lubricant on the surface of said strip.

4. A method as set forth in claim 3 wherein said strip is initially molded into a solid strip by forcing the material to flow under pressure through a cylindrical extrusion die.

5. A method for continuously molding and curing curable rubber in the form of a strip of preselected cross-sectional shape and area, comprising, with the strip under continuous pressure and being continuously advanced, the steps of initially extruding a strip having a cross-sectional area about 2% greater than said preselected cross-sectional area, radially enlarging said strip under confinement to a cross-sectional area no greater than about 20% larger than said preselected cross-sectional area while applying a thin film of lubricant to the outside surface of said strip, constricting said strip to a cross-sectional area greater than 2% larger but less than 10% larger than said preselected cross-sectional area while applying sufficient heat to said strip to cure said material, and releasing said cured strip whereby it freely assumes said preselected cross-sectional area and shape.

6. A method as set forth in claim 5 wherein said lubricant is applied through a sintered, porous lubricating ring.

7. A method of continuously forming and curing crosslinkable material having elastic memory comprising forming uncured material into a strip having a desired cross-sectional shape, applying a lubricant to the strip, continuously advancing the lubricated strip under pressure through an elongated, heated curing die and relieving the strip from confinement in the curing die only after curing thereof is substantially complete.

References Cited
UNITED STATES PATENTS

| | | | |
|---|---|---|---|
| 625,381 | 5/1899 | Clark | 25—18 |
| 2,393,452 | 1/1946 | Bailey et al. | |
| 2,597,553 | 5/1952 | Weber | 25—18 XR |
| 2,649,618 | 8/1953 | Rhodes et al. | |
| 3,265,778 | 8/1966 | Griffith. | |
| 3,288,899 | 11/1966 | Angioletti | 264—347 |
| 3,354,243 | 11/1967 | Dodge | 264—347 |

ROBERT F. WHITE, Primary Examiner

J. R. THURLOW, Assistant Examiner

U.S. Cl. X.R.

18—12; 25—18; 264—230, 347